US011608782B2

United States Patent
Menheere et al.

(10) Patent No.: US 11,608,782 B2
(45) Date of Patent: Mar. 21, 2023

(54) AXIAL INERTIAL PARTICLE SEPARATOR FOR TURBINE ENGINE

(71) Applicant: PRATT & WHITNEY CANADA CORP., Longueuil (CA)

(72) Inventors: David Menheere, Norval (CA); Santo Chiappetta, Georgetown (CA); Tim Redford, Campbellville (CA); Daniel Van Den Ende, Mississauga (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 161 days.

(21) Appl. No.: 16/849,364

(22) Filed: Apr. 15, 2020

(65) Prior Publication Data

US 2021/0324795 A1    Oct. 21, 2021

(51) Int. Cl.
*F02C 7/052* (2006.01)
*B01D 45/16* (2006.01)
*B64D 33/02* (2006.01)

(52) U.S. Cl.
CPC .............. *F02C 7/052* (2013.01); *B01D 45/16* (2013.01); *B64D 2033/0246* (2013.01); *F05D 2220/323* (2013.01); *F05D 2220/329* (2013.01); *F05D 2250/51* (2013.01); *F05D 2260/607* (2013.01)

(58) Field of Classification Search
CPC .......... F02C 7/052; B64D 2033/0246
See application file for complete search history.

(56) References Cited

U.S. PATENT DOCUMENTS

| 3,766,719 | A | 10/1973 | McAnally, III |
| 3,832,086 | A | 8/1974 | Hull, Jr. et al. |
| 3,993,463 | A | 11/1976 | Barr |
| 4,527,387 | A | 7/1985 | Lastrina et al. |
| 2003/0024233 | A1* | 2/2003 | Snyder .................. F01D 25/162 60/39.092 |
| 2015/0345331 | A1* | 12/2015 | Murray .................. F01D 25/24 415/220 |

* cited by examiner

*Primary Examiner* — Todd E Manahan
*Assistant Examiner* — David P. Olynick
(74) *Attorney, Agent, or Firm* — Norton Rose Fulbright Canada LLP.

(57) ABSTRACT

An inertial particle separator (IPS) for a gas turbine engine, has: inner and outer walls extending about a central axis, an inlet defined between the inner and outer walls and oriented axially; swirling vanes extending at least radially between the inner and outer walls and circumferentially distributed around the central axis, the swirling vanes configured for inducing a circumferential component in an airflow flowing between the swirling vanes; a plenum between the inner and outer walls downstream of the swirling vanes, the plenum circumferentially extending about the central axis, the outer wall converging toward the central axis in a direction of the airflow; and a splitter radially between the inner and outer walls downstream of the plenum and circumferentially extending around the central axis, a particle outlet radially between the splitter and the outer wall, an air outlet radially between the inner wall and the splitter.

19 Claims, 2 Drawing Sheets

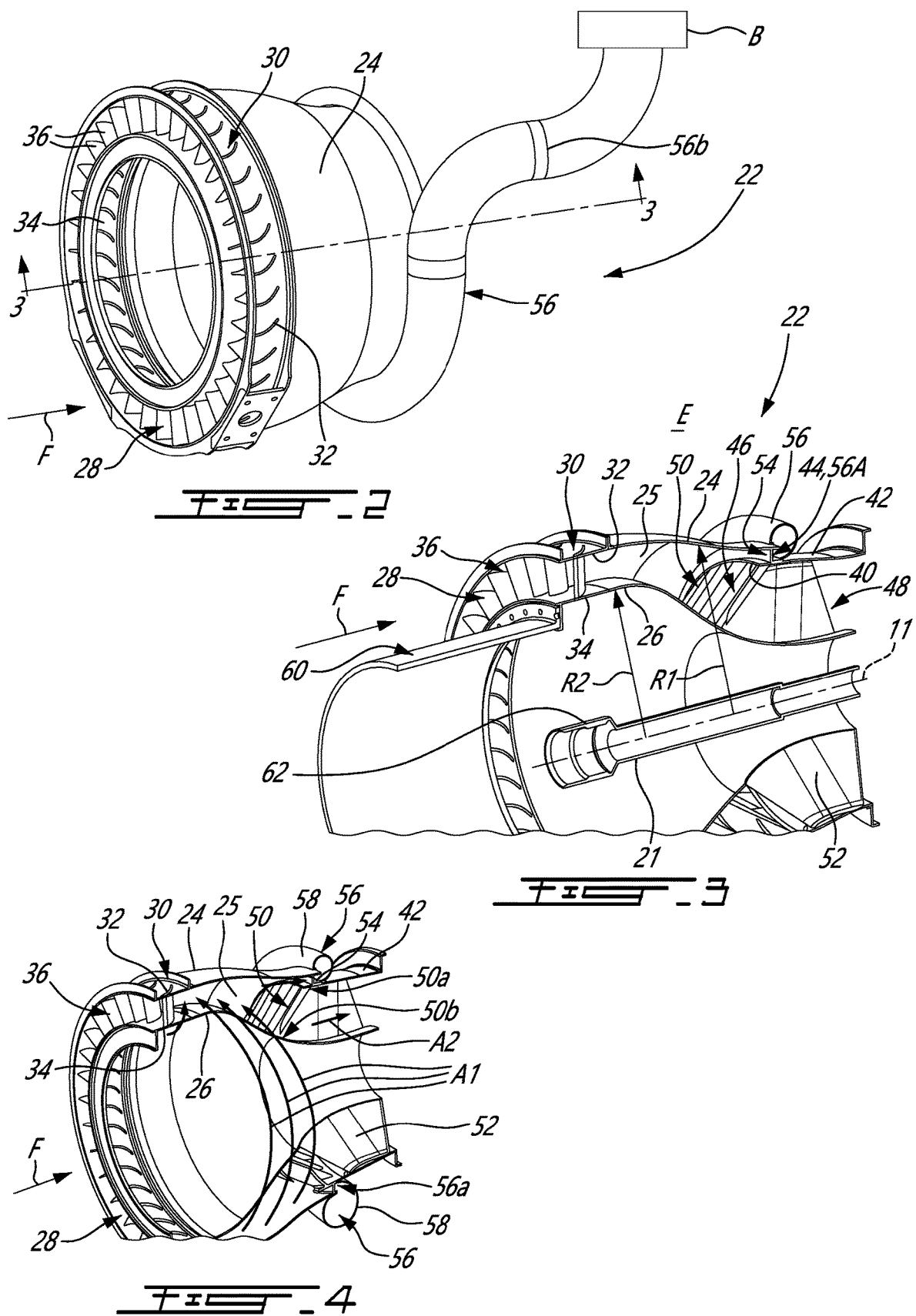

AXIAL INERTIAL PARTICLE SEPARATOR FOR TURBINE ENGINE

TECHNICAL FIELD

The application relates generally to gas turbine engines and, more particularly, to particle separators used in such engines.

BACKGROUND OF THE ART

In some operating conditions, an airflow entering an inlet of a gas turbine engine carries particles, such as ice and dust. It may be desirable to separate such particles from the air prior to directing the incoming air to engine components.

SUMMARY

In one aspect, there is provided an inertial particle separator (IPS) for a gas turbine engine, comprising: inner and outer walls circumferentially extending about a central axis, an inlet defined between the inner and outer walls and oriented axially relative to the central axis; swirling vanes extending at least radially between the inner and outer walls and circumferentially distributed around the central axis, the swirling vanes configured for inducing a circumferential component in an airflow flowing between the swirling vanes; a plenum between the inner and outer walls downstream of the swirling vanes, the plenum circumferentially extending about the central axis, the outer wall converging toward the central axis in a direction of the airflow; and a splitter radially between the inner and outer walls downstream of the plenum and circumferentially extending around the central axis, a particle outlet radially between the splitter and the outer wall, an air outlet radially between the inner wall and the splitter.

In another aspect, there is provided an inertial particle separator (IPS) for a gas turbine engine, comprising: inner and outer walls circumferentially extending about a central axis, an inlet defined between the inner and outer wall and facing a direction being mainly axial relative to the central axis; swirling vanes extending at least radially between the inner wall and the outer wall and circumferentially distributed around the central axis, the swirling vanes configured for inducing a circumferential component in air flowing therearound; a plenum between the inner and outer wall, the plenum circumferentially extending about the central axis, a radius of the outer wall decreasing in a direction of the airflow; and a splitter radially between the outer wall and the inner wall downstream of the plenum and circumferentially extending around the central axis, a particle outlet radially between the splitter and the outer wall, an air outlet radially between the inner wall and the splitter and fluidly connectable to a compressor of the gas turbine engine.

In yet another aspect, there is provided a method of separating particles from an airflow with an inertial particle separator (IPS) of a gas turbine engine having a central axis, the method comprising: receiving the airflow via an inlet of the IPS facing a direction being mainly axial relative to the central axis; increasing a circumferential component of a velocity of the airflow downstream of the inlet; further increasing the circumferential component of the velocity of the airflow by converging the flow toward the central axis; and after increasing the circumferential component and after converging the flow toward the central axis, bleeding a radially outer portion of the flow out of the IPS to an environment outside the gas turbine engine and directing a radially inner portion of the flow toward a compressor of the gas turbine engine.

DESCRIPTION OF THE DRAWINGS

Reference is now made to the accompanying figures in which:

FIG. 2 is a schematic three dimensional view of a inertial particle separator in accordance with one embodiment that may be used with the gas turbine engine of FIG. 1;

FIG. 3 is a schematic three dimensional cutaway view taken along line 3-3 on FIG. 2; and FIG. 4 is another schematic three dimensional cutaway view taken along line 3-3 on FIG. 2.

DETAILED DESCRIPTION

Figure 1:
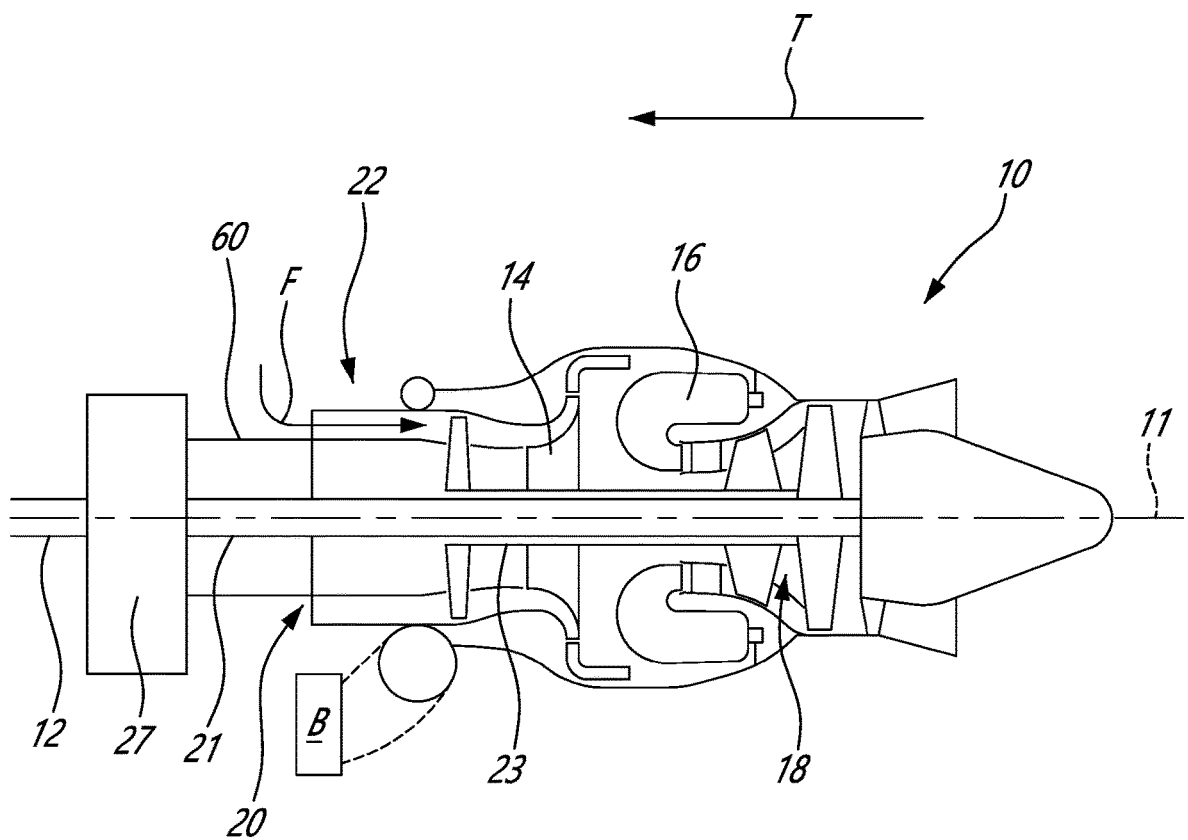
FIG. 1 is a schematic cross-sectional view of a gas turbine engine.

FIG. 1 illustrates a gas turbine engine 10 of a type preferably provided for use in subsonic flight, generally comprising in serial flow communication, a compressor section 14 for pressurizing the air, a combustor 16 in which the compressed air is mixed with fuel and ignited for generating an annular stream of hot combustion gases, and a turbine section 18 for extracting energy from the combustion gases. The compressor 14 and the turbine section 18 are rotatable about a central axis 11 of the engine 10. The gas turbine engine 10 has a low-pressure shaft 21 and a high-pressure shaft 23. The low-pressure shaft 21 is drivingly engaged to a gearbox 27. An output shaft 12 is drivingly engaged to the gearbox 27 and may be used to drive a rotatable load, such as a helicopter rotor. In the embodiment shown, the engine 10 is a turboshaft. It will be appreciated that the engine may be other types of engine such as, for instance, a turboprop engine.

As shown in FIG. 1, the engine 10 has an inlet 20 that may extend circumferentially around the central axis 11. In some operating conditions, such as icing conditions, ice particles may be ingested in to the engine 10 via the inlet 20. This may be undesirable. The ingested particles may be dust, sand, ice, etc. To at least partially remove the particles from an airflow F entering the engine 10, an inertial particle separator (IPS) 22 may be used.

Referring now to FIGS. 2-4, the inertial particle separator 22 in accordance with a possible embodiment is shown. The IPS 22 has an outer wall 24 and an inner wall 26 located radially inwardly of the outer wall 24 relative to the central axis 11. The inner and outer walls 26, 24 may extend circumferentially all around the central axis 11. A plenum 25 is located radially between the outer and inner wall 24, 26. The plenum 25 may extend circumferentially all around the central axis 11. An inlet 28 of the IPS is defined radially between the outer and inner walls 24, 26. The inlet 28 may be annular and extend circumferentially all around the central axis 11. The inlet 28 may be oriented axially relative to the central axis 11. In other words, the inlet 28 of the IPS may be facing a direction being mainly axial relative to the central axis and may be substantially aligned with a direction of travel T (FIG. 1) of the gas turbine engine 10 equipped with the IPS 22.

Referring more particularly to FIGS. 3-4, in the depicted embodiment, the IPS 22 includes a vane assembly 30. The vane assembly 30 includes outer and inner walls 32, 34 and vanes 36 extending at least radially relative to the central axis 11 between the outer and inner walls 32, 34. The vanes 36 may be secured to one or both of the inner and outer walls 34, 32 of the vane assembly 30. The outer and inner walls 32, 34 may extend circumferentially all around the central axis 11. The vanes 36 are circumferentially distributed about the central axis 11 and may be equidistantly separated from one another. In the depicted embodiment, the radius of both of the outer and inner walls 32, 34 of the vane assembly 30 is constant. Other configurations are contemplated. It will be appreciated that the outer and inner walls 32, 34 of the vane assembly 30 may be an extension of the outer and inner wall 24, 26 defining the plenum 25 therebetween. The vanes 36 are swirling vanes and are configured to impart a circumferential component in the airflow F entering the IPS 22 via the inlet 28 and flowing between the swirling vanes 36. In the embodiment shown, the swirling vanes 36 have a cambered airfoil profile. A symmetrical profile may alternatively be used. The swirling vanes 36 may be angled relative to the incoming flow F. Any configurations allowing the swirling vanes 36 to induce a circumferential component in the incoming flow F is contemplated without departing from the scope of the present disclosure. The swirling vanes 36 may have leading edges circumferentially offset from trailing edges and/or a cambered profile. In other words, the airflow F upstream of leading edges of the swirling vanes 36 may be substantially axial relative to the central axis 11 and may be substantially free of a circumferential component relative to the central axis 11. The airflow F downstream of the swirling vanes 36 may have a circumferential component greater than that upstream of the swirling vanes 36. The circumferential component is illustrated with arrows A1 in FIG. 4. Imparting a circumferential component to the flow entering the plenum 25 may allow for the particles contained in the flow F to move radially outwardly away from the central axis 11 and toward the outer wall 24 because of a centripetal force. In other words, the swirling vanes 36 induce a cyclonic flow A1 within the plenum 25 that may cause the particles to be extracted to move toward the outer wall 24 of the IPS 22. The swirling vanes 36 may be angled relative to a plane containing the central axis 11. It will be appreciated that the cyclonic flow A1 may be in a clock-wise direction or a counter-clock-wise direction based on the angle of the swirling vanes 36.

Referring more particularly to FIG. 3, as described above, the plenum 25 is located radially between the outer wall 24 and the inner wall 26. In the embodiment shown, a radius R1 of the outer wall 24 decreases in the flow direction, which is mainly axial relative to the central axis 11. A radius R2 of the inner wall 26 may decrease in the flow direction. In other words, both of the outer and inner walls 24, 26 may extend toward the central axis 11 in the flow direction away from the swirling vanes 36. In the embodiment shown, a rate of change of the radius R2 of the inner wall 26 is greater than that of the outer wall 24. A cross-sectional area of the plenum 25 taken on a plane normal to the central axis 11 may increase in the flow direction. In a particular embodiment, the increase in the cross-sectional area of the plenum 25 decreases a velocity of the flow flowing therein in an axial direction relative to the central axis 11. This may give the heavier particles more time to migrate radially outwardly toward the outer wall. In a particular embodiment, decreasing the radius R1 of the outer wall 24 accelerates a velocity of the flow flowing therein and may enhance the migration of the particles contained in the airflow F in the radially outward direction relative to the central axis 11. Stated differently, as the outer diameter of the plenum 25 shrinks, the path travelled by the cyclonic flow A1 may decrease in length. This may cause the flow to increase in velocity and may improve particle separation.

Still referring to FIG. 3, the IPS 22 includes a splitter 40. The splitter 40 may correspond to an edge of a splitter wall 42 circumferentially extending all around the central axis 11. The IPS 22 includes a particle outlet 44 located radially between the outer wall 24 and the splitter 40 and an air outlet 46 between the inner wall 26 and the splitter 40. The air outlet 46 is in fluid flow communication with the compressor section 14 (FIG. 1) of the engine 10 via an air conduit 48. The particle outlet 44 is in fluid flow communication with an environment E outside the engine 10 for expelling the particles outboard of the engine 10 and/or to an exhaust of the engine 10.

Referring more particularly to FIG. 4, the IPS 22 further includes deswirling vanes 50 that extend at least radially between the splitter wall 42 and the inner wall 26. The deswirling vanes 50 are circumferentially distributed about the central axis 11 and may be equidistantly separated from one another. The deswirling vanes 50 are configured to reduce or remove a circumferential component in the airflow F flowing therearound. The deswirling vanes 50 may have a cambered airfoil profile. The deswirling vanes 50 may be angled relative to the airflow F. Any configurations allowing the deswirling vanes 50 to reduce the circumferential component of the airflow F is contemplated without departing from the scope of the present disclosure. The deswirling vanes 50 may have leading edges circumferentially offset from trailing edges and/or a cambered profile. In other words, the airflow F upstream of leading edges of the deswirling vanes 50 may be substantially circumferential relative to the central axis 11. The airflow F downstream of the deswirling vanes 50 may have a circumferential component less than that upstream of the deswirling vanes 50. The airflow F downstream of the deswirling vanes 50 is illustrated with arrows A2 in FIG. 4 and may be mainly aligned in an axial direction relative to the central axis 11. Removing a circumferential component to the flow exiting the plenum 25 and entering the air conduit 48 may allow to improve an efficiency of the compressor section 14 (FIG. 1) compared to a configuration devoid of deswirling vanes. In a particular embodiment, deswirling the flow may increase an efficiency of the compressor section compared to a configuration in which the flow is not deswirled before being fed to the compressor section.

The deswirling vanes 50 may extend in both of an axial direction and a radial direction relative to the central axis 11. More specifically, radially outer ends 50a of the deswirling vanes 50 may be located radially outwardly and axially aft of radially inner ends 50b of the deswirling vanes 50. In other words, the deswirling vanes 50 may extend radially away from the central axis 11 and axially rearward toward the compressor section 14 (FIG. 1) from their radially inner ends 50b to the radially outer rends 50a. Stated differently, the deswirling vanes 50 may extend at least partially in an axial direction that is parallel to the direction of the airflow F. In the embodiment shown, the deswirling vanes 50 are angled relative to the central axis 11 such that the flow F is substantially perpendicular to said vanes 50. Having the flow F substantially perpendicular to the deswirling vanes 50 may reduce losses compared to a configuration in which the flow F is not perpendicular to the deswirling vanes 50.

As shown in FIG. 4, struts 52 may be located in the air conduit 48 downstream of the deswirling vanes 50 and upstream of the compressor section 16. The struts 52 may be hollow. In the embodiment shown, a chord of the struts increases from their radially outer ends to their radially inner ends. The struts 52 may be primarily structural. They may be used to allow oil to transit in and out for the lubrication of bearings and other internal components. The decrease in chords of the struts 52 in the radial direction may facilitate improved oil drainage, particularly during nose up or down maneuvers of an aircraft.

Referring to FIGS. 2 and 4, in the embodiment shown, the IPS 22 has an exhaust plenum 56, also referred to as scavenge blower exhaust plenum, or exhaust scroll. The exhaust plenum 56 may be defined by an exhaust wall 58 that extends circumferentially around the central axis 11. The exhaust wall 58 may have a substantially cylindrical shape and may be secured to both of the splitter wall 42 and to the outer wall 24. The exhaust wall 58 may have two edges both circumferentially extending around the central axis 11. One of the two edges may be secured to the splitter wall 42 whereas the other of the two edges may be secured to the outer wall 24. An inlet 56a (FIG. 4) of the exhaust plenum 56 may include an annulus radially between the two edges of the wall 42. The inlet 56a of the exhaust plenum 56 may be radially between the outer wall 24 and the splitter wall 42.

A diameter of the exhaust plenum 56 may vary in a circumferential direction relative to the central axis 11. More specifically, and as shown in FIG. 2, the exhaust plenum 56 has an outlet 56b. The diameter of the exhaust plenum 56 increases in the circumferential direction toward the outlet 56b. The circumferential direction in which the exhaust plenum 56 increases in diameter may be in the same orientation (e.g., counter-clockwise) than the swirling or cyclonic flow A1 within the plenum 25. Stated differently, a cross-sectional area of the exhaust plenum 56 taken on a plane containing the central axis 11 may increase in a direction of rotation of the cyclonic flow A1. In a particular embodiment, the plenum diameter increases in the direction of the outlet 56b to keep the velocity substantially constant throughout the exhaust plenum 56.

Referring to FIG. 2, the outlet 56b of the exhaust plenum 56 is fluidly connected to a blower B for suctioning the particles contained in the exhaust plenum 56 out thereof and to expel the particles in the environment E outside the engine 10. The blower B may be operable to create a pressure drop to suction the particles out of the exhaust plenum 56. The blower B may be any suitable means able to create such a pressure differential, such as, a fan or an impeller. The blower B may be a scoop configured to, in use, create a pressure drop to suction the particles out of the exhaust plenum 56.

Referring to FIGS. 2 and 4, in the embodiment shown, the IPS 22 includes second swirling vanes 54 circumferentially distributed about the central axis 11. The second swirling vanes 54 are located downstream of the particle outlet 44 and extend at least radially between the splitter wall 42 that defines the splitter 40 and the outer wall 24. The second swirling vanes 54 may be located upstream of the exhaust plenum 56. The second swirling vanes 54 may be used to keep the flow swirling around the central axis 11 so that when it enters the exhaust plenum 56, it may be easier to remove. Moreover, the second swirling vanes 54 may be used to keep the swirling motion of the particles. This may keep the particles suspended in the flow so they may not accumulate before they are exhausted in the environment E.

Referring to FIG. 3, the engine 10 may include an annular wall 60 that may be secured to the inner wall 26 of the IPS 22. The annular wall 60 may be concentric with the central axis 11. This annular wall 60 may be used to mount a gearbox to the engine 10. The gearbox may be in driving engagement with a shaft 62 of the engine 10.

The present disclosure pertains to a fabricated air inlet for a gas turbine engine with an integrated inertia particle separator. The axial inlet may feed air into a set of vanes which may swirl the inlet air setting up a cyclonic flow which may cause heavier particles to migrate to the outer wall of the plenum. The plenum may decrease in radius in the flow direction which may increase particle separation. The outer layer of flow, which may be saturated with particles, may be bleed off through an annulus via a scavenge blower which exhaust the flow overboard or into the exhaust of the gas turbine engine 10. The main flow may continue to the engine inlet where it may be straightened by vanes before entering the compressor.

Components such as the swirling vanes 36, the annular wall 60, and the struts 52 may be made of a metallic material, such as steel, or may be made of titanium. The exhaust wall 58 of the exhaust plenum 56, the second swirling vanes 54, the deswirling vanes 50, and the inner and outer walls 24, 26 may be made of composite material or any suitable material that is lighter than the material of the struts 52.

For separating particles from the airflow F, the airflow F is received via the inlet 28 of the IPS 22 facing a direction being mainly axial relative to the central axis 11; a circumferential component of a velocity of the airflow F is increased downstream of the inlet 28; the circumferential component of the velocity of the airflow F is further increased by converging the flow F toward the central axis 11; and after increasing the circumferential component and after converging the flow toward the central axis 11, a radially outer portion of the flow is bled out of the IPS 22 to the environment E outside the gas turbine engine 10 a radially inner portion of the flow is directed toward the compressor 14 of the gas turbine engine 10.

Embodiments Disclosed Herein Include

A. An inertial particle separator (IPS) for a gas turbine engine, comprising: inner and outer walls circumferentially extending about a central axis, an inlet defined between the inner and outer walls and oriented axially relative to the central axis; swirling vanes extending at least radially between the inner and outer walls and circumferentially distributed around the central axis, the swirling vanes configured for inducing a circumferential component in an airflow flowing between the swirling vanes; a plenum between the inner and outer walls downstream of the swirling vanes, the plenum circumferentially extending about the central axis, the outer wall converging toward the central axis in a direction of the airflow; and a splitter radially between the inner and outer walls downstream of the plenum and circumferentially extending around the central axis, a particle outlet radially between the splitter and the outer wall, an air outlet radially between the inner wall and the splitter.

B. An inertial particle separator (IPS) for a gas turbine engine, comprising: inner and outer walls circumferentially extending about a central axis, an inlet defined between the inner and outer wall and facing a direction being mainly axial relative to the central axis; swirling vanes extending at least radially between the inner wall and the outer wall and circumferentially distributed around the central axis, the swirling vanes configured for inducing a circumferential component in air flowing therearound; a plenum between the inner and outer wall, the plenum circumferentially extending about the central axis, a radius of the outer wall decreasing in a direction of the airflow; and a splitter radially between the outer wall and the inner wall downstream of the plenum and circumferentially extending around the central axis, a particle outlet radially between the splitter and the outer wall, an air outlet radially between the inner wall and the splitter and fluidly connectable to a compressor of the gas turbine engine.

Embodiments A and B May Include any of the Following Elements in any Combinations Element 1: the swirling vanes are angled relative to a plane containing the central axis for inducing the circumferential component in the incoming flow. Element 2: the swirling vanes have a cambered profile. Element 3: a radius of the inner wall extends decreases between the swirling vanes and the splitter in a flow direction extending from the swirling vanes toward the splitter. Element 4: deswirling vanes extending at least radially from the splitter toward the inner wall. Element 5: the deswirling vanes are angled relative to a plane containing the central axis and/or have a cambered profile. Element 6: a blower is in fluid flow communication with the particle outlet to draw particles out of the plenum. Element 7: second swirling vanes circumferentially distributed about the central axis and extending at least radially between the outer wall and the splitter. Element 8: an exhaust plenum downstream of the particle outlet and circumferentially extending around the central axis, the exhaust plenum having an annular inlet in fluid flow communication with the plenum and extending between the outer wall and the splitter, and an outlet fluidly connected to a blower. Element 9: the exhaust plenum has a cross-sectional area taken on a plane containing the central axis increasing in a circumferential direction and toward the outlet. Element 10: the swirling vanes are angled relative to an incoming flow for inducing the circumferential component in the incoming flow. Element 11: the swirling vanes have a cambered profile. Element 12: a radius of the inner wall decreases in a flow direction extending from the swirling vanes toward the splitter. Element 13: deswirling vanes extending at least radially from the splitter toward the inner wall. Element 14: the deswirling vanes are angled relative to a flow in the plenum. Element 15: second swirling vanes circumferentially distributed about the central axis and extending at least radially between the outer wall and the splitter. Element 16: an exhaust plenum downstream of the particle outlet and circumferentially extending around the central axis, the exhaust plenum having an inlet being annular and extending between the outer wall and the splitter, and an outlet fluidly connected to a blower oriented to draw particles out of the exhaust plenum. Element 17: wherein the exhaust plenum has a cross-sectional area taken on a plane containing the central axis increasing in a circumferential direction and toward the outlet.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. An inertial particle separator (IPS) for a gas turbine engine, comprising:
    inner and outer walls circumferentially extending about a central axis wherein the outer wall is radially outward of the inner wall, an inlet defined between the inner and outer walls and oriented axially relative to the central axis;
    swirling vanes extending at least radially between the inner and outer walls and circumferentially distributed around the central axis, the swirling vanes configured for inducing a circumferential component in an airflow flowing between the swirling vanes;
    a plenum between the inner and outer walls downstream of the swirling vanes, the plenum circumferentially extending about the central axis, the outer wall converging toward the central axis in a direction of the airflow along a converging portion of the outer wall the outer wall extending from an upstream end to a downstream end located at a leading edge of a splitter and the swirling vanes located at the upstream end, the upstream end located radially outwardly of the downstream end relative to the central axis, a radius of the inner wall decreasing at a greater rate than the radius of the outer wall from the swirling vanes to the leading edge of the splitter such that a cross-sectional area of the plenum increases; and
    the splitter radially between the inner and outer walls downstream of the plenum and circumferentially extending around the central axis, the converging portion of the outer wall located upstream of a leading edge of the splitter, a particle outlet radially between the splitter and the outer wall, an air outlet radially between the inner wall and the splitter.

2. The IPS of claim 1, wherein the swirling vanes are angled relative to a plane containing the central axis for inducing the circumferential component in the incoming flow.

3. The IPS of claim 2, wherein the swirling vanes have a cambered profile.

4. The IPS of claim 1, wherein a radius of the inner wall decreases between the swirling vanes and the splitter in a flow direction extending from the swirling vanes toward the splitter.

5. The IPS of claim 1, further comprising deswirling vanes extending at least radially from the splitter toward the inner wall.

6. The IPS of claim 5, wherein the deswirling vanes are angled relative to a plane containing the central axis and/or have a cambered profile.

7. The IPS of claim 1, comprising a blower is in fluid flow communication with the particle outlet to draw particles out of the plenum.

8. The IPS of claim 1, further comprising second swirling vanes circumferentially distributed about the central axis and extending at least radially between the outer wall and the splitter.

9. The IPS of claim 1, further comprising an exhaust plenum downstream of the particle outlet and circumferentially extending around the central axis, the exhaust plenum having an annular inlet in fluid flow communication with the plenum and extending between the outer wall and the splitter, and an outlet fluidly connected to a blower.

10. An inertial particle separator (IPS) for a gas turbine engine, comprising:
    inner and outer walls circumferentially extending about a central axis wherein the outer walls is radially outward of the inner wall, an inlet defined between the inner and outer walls and oriented axially relative to the central axis;
    swirling vanes extending at least radially between the inner and outer walls and circumferentially distributed around the central axis, the swirling vanes configured for inducing a circumferential component in an airflow flowing between the swirling vanes;
    a plenum between the inner and outer walls downstream of the swirling vanes, the plenum circumferentially extending about the central axis, the outer wall converging toward the central axis in a direction of the airflow along a converging portion of the outer wall the outer wall extending from an upstream end to a downstream end located at a leading edge of a splitter and the swirling vanes located at the upstream end, the upstream end located radially outwardly of the downstream end relative to the central axis, a radius of the inner wall decreasing at a greater rate than the radius of the outer wall from the swirling vanes to the leading edge of the splitter such that a cross-sectional area of the plenum increases; and the splitter radially between the inner and outer walls downstream of the plenum and circumferentially extending around the central axis, the converging portion of the outer wall located upstream of a leading edge of the splitter, a particle outlet radially between the splitter and the outer wall, an air outlet radially between the inner wall and the splitter and fluidly connectable to a compressor of the gas turbine engine.

11. The IPS of claim 10, wherein the swirling vanes are angled relative to an incoming flow for inducing the circumferential component in the incoming flow.

12. The IPS of claim 11, wherein the swirling vanes have a cambered profile.

13. The IPS of claim 12, wherein a radius of the inner wall decreases in a flow direction extending from the swirling vanes toward the splitter.

14. The IPS of claim 13, further comprising deswirling vanes extending at least radially from the splitter toward the inner wall.

15. The IPS of claim 14, wherein the deswirling vanes are angled relative to a flow in the plenum.

16. The IPS of claim 14, further comprising second swirling vanes circumferentially distributed about the central axis and extending at least radially between the outer wall and the splitter.

17. The IPS of claim 16, further comprising an exhaust plenum downstream of the particle outlet and circumferentially extending around the central axis, the exhaust plenum having an inlet being annular and extending between the outer wall and the splitter, and an outlet fluidly connected to a blower oriented to draw particles out of the exhaust plenum.

18. The IPS of claim 17, wherein the exhaust plenum has a cross-sectional area taken on a plane containing the central axis increasing in a circumferential direction and toward the outlet.

19. A method of separating particles from an airflow with an inertial particle separator (IPS) of a gas turbine engine having a central axis, the method comprising:

receiving the airflow via an inlet of the IPS facing a direction being mainly axial relative to the central axis;

increasing, using swirling vanes located downstream of the inlet, a circumferential component of a velocity of the airflow downstream of the inlet;

further increasing the circumferential component of the velocity of the airflow by converging the flow towards the central axis with an outer wall of the IPS, wherein the flow is converged in a plenum including the outer wall and an inner wall radially inward of the outer wall, the outer wall extending from an upstream end to a downstream end located at a leading edge of a splitter, the swirling vanes located at the upstream end of the outer wall and the leading edge of the splitter located at the downstream end of the outer wall, the upstream end located radially outwardly of the downstream end relative to a central axis, a radius of the inner wall decreasing at a greater rate than a radius of the outer wall from the swirling vanes to the leading edge of the splitter such that a cross-sectional area of the plenum increases; and after increasing the circumferential component and after converging the flow toward the central axis, bleeding a radially outer portion of the flow out of the IPS to an environment outside the gas turbine engine and directing a radially inner portion of the flow toward a compressor of the gas turbine engine.

\* \* \* \* \*